United States Patent
Lee et al.

(10) Patent No.: US 8,045,489 B2
(45) Date of Patent: Oct. 25, 2011

(54) METHOD AND SYSTEM FOR THE AUTOMATIC CONFIGURATION OF CONFERENCE RESOURCES

(75) Inventors: David Cheng-Wei Lee, Sunnyvale, CA (US); Fadi Jabbour, Sunnyvale, CA (US); Eric H. Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 931 days.

(21) Appl. No.: 11/693,893

(22) Filed: Mar. 30, 2007

(65) Prior Publication Data

US 2008/0239995 A1   Oct. 2, 2008

(51) Int. Cl.
*H04L 12/16* (2006.01)
*H04Q 11/00* (2006.01)

(52) U.S. Cl. .......................... 370/260; 370/259
(58) Field of Classification Search .................... 370/260
See application file for complete search history.

(56) References Cited

U.S. PATENT DOCUMENTS

| | | | |
|---|---|---|---|
| 5,483,587 A | 1/1996 | Hogan et al. | 379/202.01 |
| 5,546,449 A | 8/1996 | Hogan et al. | 379/202.01 |
| 5,903,637 A | 5/1999 | Hogan et al. | 379/203.01 |
| 5,933,417 A | 8/1999 | Rottoo | 370/260 |
| 5,978,463 A | 11/1999 | Jurkevics et al. | 379/202.01 |
| 6,038,304 A | 3/2000 | Hart | 379/202.01 |
| 6,105,054 A | 8/2000 | Kawashima | 709/204 |
| 6,195,117 B1 | 2/2001 | Miyazaki | 348/14.09 |
| 6,282,278 B1 | 8/2001 | Doganata et al. | 379/202.01 |
| 6,324,169 B1 | 11/2001 | Roy | 370/260 |
| 6,411,601 B1 | 6/2002 | Shaffer et al. | 370/230 |
| 6,466,252 B1 | 10/2002 | Miyazaki | 370/260 |
| 6,606,305 B1 | 8/2003 | Boyle et al. | 370/260 |
| 6,744,460 B1 | 6/2004 | Nimri et al. | 348/14.11 |
| 6,772,436 B1 | 8/2004 | Doganata et al. | 725/106 |
| 6,798,753 B1 | 9/2004 | Doganata et al. | 370/260 |
| 6,807,563 B1 | 10/2004 | Christofferson et al. | 709/204 |
| 6,839,417 B2 | 1/2005 | Weisman et al. | 379/204.01 |
| 6,870,916 B2 | 3/2005 | Henrikson et al. | 379/202.01 |
| 6,876,734 B1 | 4/2005 | Summers et al. | 379/202.01 |
| 7,085,243 B2 | 8/2006 | Decker et al. | 370/261 |
| 7,184,524 B2 | 2/2007 | Digate et al. | 378/88.17 |
| 7,213,050 B1 | 5/2007 | Shaffer et al. | 709/204 |
| 7,328,406 B2 * | 2/2008 | Kalinoski et al. | 715/738 |
| 2002/0069094 A1 * | 6/2002 | Bingham et al. | 705/5 |

(Continued)

FOREIGN PATENT DOCUMENTS

WO    WO 2004/114662    12/2004

OTHER PUBLICATIONS

2005 Crestron Product Catalog, Second Edition, Crestron Electronics, Inc. 15 Volvo Drive, Rockleigh, NJ 07647, copyright 2005.*

(Continued)

*Primary Examiner* — Daniel Wu
*Assistant Examiner* — Frederick Ott
(74) *Attorney, Agent, or Firm* — Baker Botts L.L.P.

(57) ABSTRACT

A method for the automatic configuration of conference resources includes receiving a user request identifying at least one conference resource to be used in a conference. The at least one conference resource is reserved for the conference. Operation of the conference resource is automatically initiated without user interaction.

33 Claims, 2 Drawing Sheets

U.S. PATENT DOCUMENTS

| | | | | |
|---|---|---|---|---|
| 2002/0078153 | A1* | 6/2002 | Chung et al. | 709/204 |
| 2002/0118688 | A1 | 8/2002 | Jagannathan | 370/410 |
| 2003/0103075 | A1* | 6/2003 | Rosselot | 345/717 |
| 2004/0010548 | A1 | 1/2004 | Hamilton et al. | 709/204 |
| 2004/0105395 | A1 | 6/2004 | Friedrich et al. | 370/261 |
| 2005/0034079 | A1* | 2/2005 | Gunasekar et al. | 715/753 |
| 2006/0045253 | A1 | 3/2006 | Bieselin et al. | 379/202.01 |
| 2008/0084984 | A1* | 4/2008 | Levy et al. | 379/202.01 |

OTHER PUBLICATIONS

Rosenberg et al., "SIP for Presence," Internet Engineering Task Force, Bell Laboratories, Columbia University, XP002173451, http://www.alternic.org/drafts/drafts-r-s/draft-rosenberg-sip-pip-00.txt., 18/21 pages, Nov. 13, 1998.

Cisco Systems, Inc., "Cisco Conference Connection", Data Sheet, Internet Publication, http://www.cisco.com/warp/public/cc/pd/unco/cvco/prodlit/confr_ds.pdf, 7 pages, Jun. 2003.

Latitude Communications, "Meetingplace Web 4.0, Secure, cost-effective web conferencing for enterprises", © 2003 Latitude Communications, Inc., Internet Publication, http://www.latitude.com/pdfs/Web4.0.pdf, 2 pages, 2003.

U.S. Appl. No. 10/754,963, filed Jan. 8, 2004, entitled "Method and System for Managing Conference Resources", 43 pages specification, claims and abstract, 2 pages of drawings, inventors Shmuel (nmi) Shaffer et al.

U.S. Appl. No. 11/046,320, filed Jan. 28, 2005, entitled "Method and System for Reserving Resources of a Multipoint Conference", 44 pages specification, claims and abstract, 2 pages of drawings, inventors Shmuel (nmi) Shaffer et al.

U.S. Appl. No. 10/046,067, filed Jan. 28, 2005, entitled "Method and System for Reserving Facility Resources for a Conference", 42 pages specification, claims and abstract, 2 pages of drawings, inventors Shmuel (nmi) Shaffer et al.

PCT, International Search Report and Written Opinion (ISA/EPO) for PCT/US2006/027779, 15 pages, Jan. 2, 2007.

* cited by examiner

METHOD AND SYSTEM FOR THE AUTOMATIC CONFIGURATION OF CONFERENCE RESOURCES

TECHNICAL FIELD OF THE INVENTION

The present invention relates generally to communication systems and, more particularly, to a method and system for the automatic configuration of conference resources.

BACKGROUND OF THE INVENTION

Historically, telecommunications have involved the transmission of voice and fax signals over a network dedicated to telecommunications, such as the Public Switch Telephone Network (PSTN) and a Private Branch Exchange (PBX). Similarly, data communications between computers have been historically transmitted on a dedicated data network, such a Local Area Network (LAN) or a Wide Area Network (WAN). Currently telecommunications and data transmissions are being merged into an integrated communication network using technology such as Voice over Internet Protocol (VoIP). Since many LANs and WANs transmit computer data using Intranet Protocol (IP), VoIP uses this existing technology to transmit voice and fax signals by converting these signals into digital data and encapsulating the data for transmission over an IP network.

Traditional communication networks often support multipoint conferences between a number of participants using different communication devices. A multipoint conference unit (MCU) is used to couple these devices, which allows users from distributed geographic locations to participate in the conference. The conference may be audio only (e.g., a teleconference) or may include video conferencing/broadcasting.

Conference systems utilize various resources when hosting a conference. Such resources may be reserved in advance of the conference. As a result, numerous algorithms and systems have been developed to facilitate more flexible reservation systems of conference resources. For example, some systems include methods for reserving network bandwidth that would be required for conducting a VoIP conference. Some systems include methods for reclaiming and recycling conference ports of users who leave a given conference. In addition, some systems include methods for finding and booking conference rooms (and/or other fixed resources). For example, users may have knowledge of available local conference resources, and scheduling systems may consult the location information of the scheduler (and/or invited participants) to match with the nearest available conference resource(s).

Current reservation systems, however, do not allow for the unified scheduling of individuals, conference rooms, and conference equipment. Furthermore, even when resources are reserved in advance, a great deal of effort and human involvement is required to power up and configure the resources at the start of the conference.

SUMMARY OF THE INVENTION

The present invention provides a method and system for the automatic configuration of conference resources that substantially eliminates or reduces at least some of the disadvantages and problems associated with previous methods and systems.

In accordance with a particular embodiment of the present invention, a method for the automatic configuration of conference resources includes receiving a user request identifying at least one conference resource to be used in a conference. The at least one conference resource is reserved for the conference. Operation of the conference resource is automatically initiated without user interaction.

Technical advantages of particular embodiments include systems and methods that enable conference resources to act as active participants in a conference meeting. For example, conference resources may be automatically configured to power on or otherwise begin to operate based on a calendared event or other reservation-triggered event. Specifically, reserved conference resources may be automatically powered-up at the occurrence of or just before a designated time of the conference. As a result, the initiation of a conference may be more seamless, and conference participants may focus on the substantive purpose of the conference meeting rather than the equipment being used. Employee resources are saved since conference attendees are not required to get conference equipment up and running prior to the conference meeting. Furthermore, where the above-described services are offered on a multipoint level, conference equipment at different locations may be powered up at the same time. Accordingly, certain embodiments, may allow conference participants at all the locations to be brought into the conference at the same time, preventing some conference participants from missing the beginning of a conference meeting.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
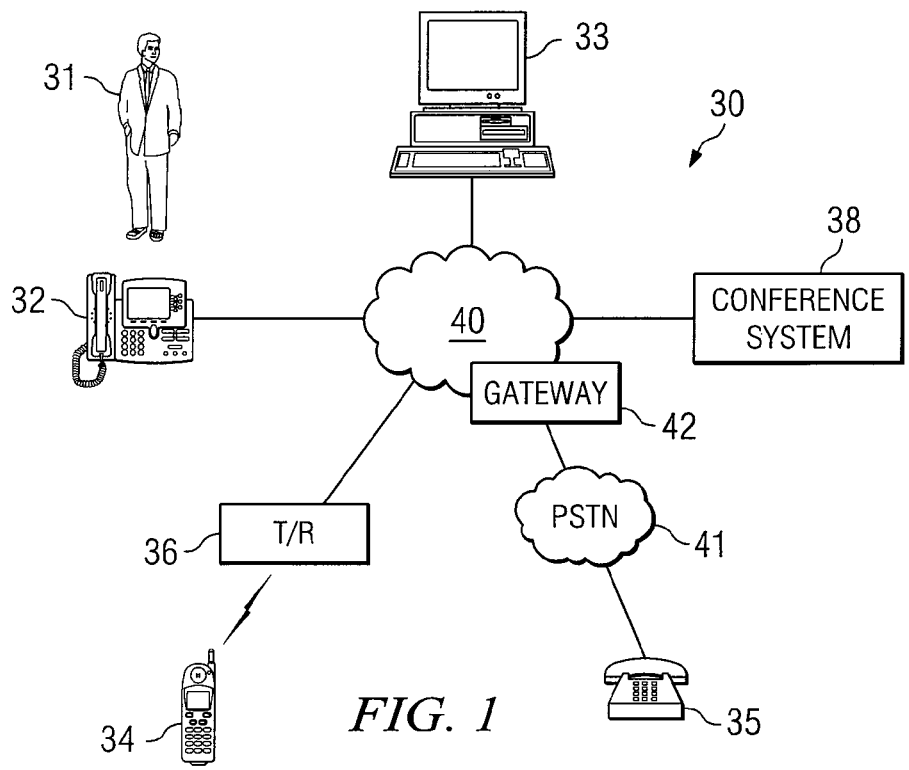
FIG. 1 illustrates a communication system with a plurality of endpoints and a conference system, in accordance with a particular embodiment.

FIG. 1 illustrates a communication system 30 including a plurality of endpoints 32-35 having the ability to establish communication sessions with each other and/or a conference system 38. Such communication sessions may be established using communication networks 40, 41 and/or additional endpoints, components, or resources coupled with communication networks 40 or 41. Conference system 38 reserves, configures, and automatically initiates operation of conference-enabled resources. Additionally, conference system 38 provides multipoint conference services, including conference hosting and/or facilitation, to users of endpoints 32-35, such as user 31 of endpoint 32. In particular embodiments, conference system 38 may comprise a multipoint conference unit (MCU) that hosts, or accommodates, multipoint conferences between and among endpoints 32-35. An MCU or other entity may be considered to be hosting a conference if it is one or more of the components that accommodates or otherwise provides conference resources to facilitate the conference.

In accordance with the present invention, systems and methods are provided that result in the automatic configuration of conference-enabled resources based on a calendar event or other reservation-triggered event. For example, reserved conference resources may be automatically powered-up at the occurrence of the designated time of the conference. The reserved conference resources may include resources for multipoint conferences conducted over telecommunications networks, such as communication ports and digital signal processing (DSP) resources. The reserved conference resources may also include facility resources, such as projectors, computers, and other equipment. Information from calendaring or other reservation systems may be utilized to determine if a resource will participate in a given conference and initiate operation of the resource at the calendared time. As a result, conference resources are better utilized.

In some embodiments, the conference may be a multipoint conference such as a Meet Me Conference call. A Meet Me Conference call is an arrangement by which a user can dial a specific, pre-determined telephone number and enter a security access code to join a conference with other participants. The user is automatically connected to the conference through a conference bridge of conference system 38. Conference participants may call in at a preset time or may be directed to do so by a conference coordinator. Meet Me Conferences may be set up through a teleconferencing service provider, generally with the capability to conference thousands of participants in a single conference call.

Other types of conferences may also be accommodated within the teachings of the present invention. For example, in particular embodiments, a conference may comprise a physical meeting of a plurality of participants at a conference room or other location. In some cases, a conference may comprise a combination of a multipoint Meet Me conference call and a physical meeting of a plurality of participants. For example, some conferences may include a communication session among a plurality of endpoints, where each endpoint is being used in a respective conference room by a plurality of participants.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication networks 40 and 41. In the illustrated embodiment, endpoints 32-34 include an internet protocol (IP) phone, a personal computer and a cellular phone, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media and participating in a conference. For example, the described technologies and techniques for establishing a communication session between or among endpoints 32-35 may be operable to establish a multipoint conference between more than two endpoints 32-35.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may comprise one or more networks, including the Internet, the public switched telephone network, local area networks (LANs), global distributed networks such as intranets and extranets and/or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol, each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 may include the transfer of packets across one or more communication paths that couple endpoints 32-35 and/ or conference system 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and conference system 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system (e.g., MGCP, H.323, SIP, etc.) and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
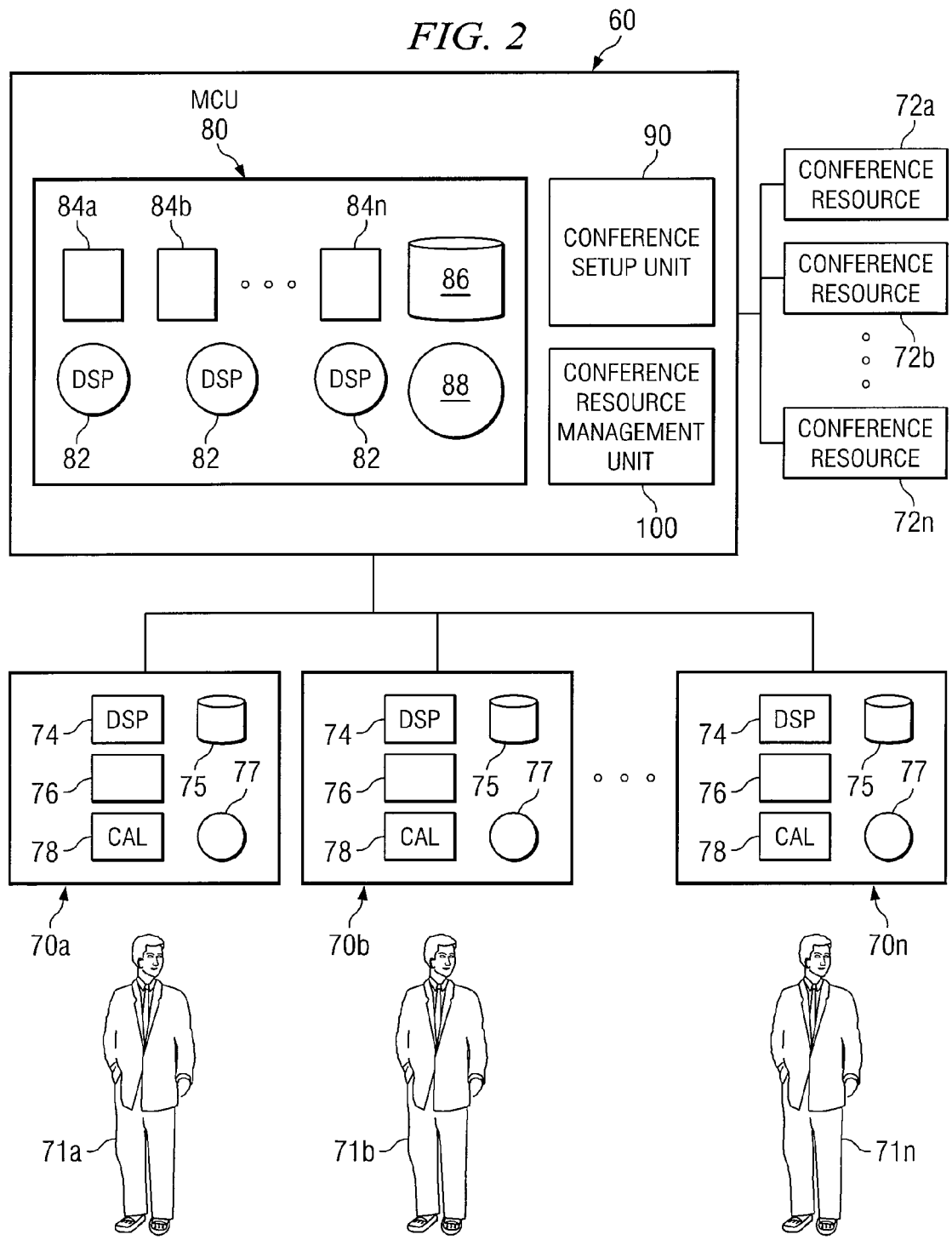
FIG. 2 illustrates a conference system, in accordance with a particular embodiment.

FIG. 2 illustrates a conference system 60 coupled to a plurality of endpoints 70, in accordance with a particular embodiment. Conference system 60 provides conference setup and hosting services for invited conference participants. Such conference participants may include users 71a-71n. Additionally, such conference participants may include conference resources 72a-72b that have been reserved for the meeting.

In the illustrated embodiment, conference system 60 includes an MCU 80, a conference setup unit 90, and a conference resource management unit 100. MCU 80 provides multipoint conference functionality between users 71a-71n of endpoints 70a-70n. Conference setup unit 90 and conference management unit 100 may cooperate to perform the setup and management of conference resources 72a-72b. For example, conference setup unit 90 may invite users 71a-71n to the multipoint conference and automatically reserve conference resources based on the needs indicated by the conference scheduler and/or invited participants. Conference resource management unit 100 may then automatically initiate operation of reserved conference resources based on the reservation. However, although conference set up unit 90 and conference management unit 100 are illustrated as being separate components within conference system 60, it is generally recognized that a single element of conference system 60 (conference setup unit 90, conference management unit 100, or another element) may perform the described functionality. Thus, the illustrated embodiment is just one example of a conference system 60 for performing the setup and management of conference resources 72a-72n.

Endpoints 70a-70n may be similar to one or more of the endpoints described above with respect to FIG. 1, such as IP phone endpoint 32. It should be understood that endpoints 70a-70n may be coupled to components of conference system 60 such as MCU 80, conference setup unit 90, and conference resource management unit 100 through one or more communication networks, such as communication networks 40 and 41 described above with respect to FIG. 1 which may include one or more WANs or LANs as indicated above.

In the illustrated embodiment, endpoints 70a-70n each include a digital signal processor (DSP) 74, memory 75, user interface 76, a processor 77 and a calendar 78. DSP 74 comprises a codec that converts voice, video or fax signals generated by the users of the telephony devices from analog media signals into digital form. The codec may be implemented either in software or as special-purpose hardware in the endpoints.

Memory 75 may include any form of volatile or nonvolatile memory including, without limitation, magnetic media, optical media, random access memory (RAM), read only memory (ROM), removable media or any other suitable local or remote memory component. Processor 77 may comprise one or more microprocessors, controllers or any other suitable computing devices or resources.

User interface 76 may include a microphone, video camera, speaker, keyboard, video display, LCD display and/or other device. In some embodiments, an endpoint's user interface 76 may be coupled with components that include a microphone, video camera, speaker, keyboard, video display and/or other device, rather than incorporating such components into the endpoint.

Calendar 78 may include a scheduling information for one or more users of the endpoint. The scheduling information may be used by a conference administrator or by a conference system to schedule a conference. In some embodiments, the conference system may view calendars 78 to determine whether invitees will attend a scheduled conference so that resources may be reserved accordingly.

MCU 80 acts as an intermediary during the multipoint communication conference, collects all audio and/or video streams transmitted by the participants through their endpoints and distributes such streams to participants of the multipoint conference at their endpoints. MCU 80 may include any bridging or switching device used in support of multipoint conferencing, including videoconferencing. In various embodiments, MCU 80 may include hardware, software and/or embedded logic. MCU 80 may be configured to support any number of conference endpoints communicating on any number of conferences, simultaneously. MCU 80 may be in the form of customer provided equipment (CPE, e.g., beyond the network interface) or may be embedded in a wide area network (WAN). Examples of multipoint conference unit standards are defined in ITU-T H.323, with T.120 describing generic conference control functions. MCU 80 utilizes certain resources to effectively host each conference.

In the illustrated embodiment, MCU 80 includes a plurality of digital signal processors (DSPs) 82, a plurality of communication ports 84a-84n, a processor 88 and memory 86. DSPs 82 include codecs that decode received media streams so that they may be bridged together to form a mixed stream that is coded by the DSPs for transmission to conference participants. In particular embodiments, MCU 80 may include software functioning as a DSP on a general purpose central processing unit, such as processor 88. Communication ports 84 may comprise audio and/or video communication ports.

Memory 86 may be any form of volatile or nonvolatile memory including, without limitation, magnetic media, optical media, random access memory (RAM), read only memory (ROM), removable media or any other suitable local or remote memory component. Processor 88 may be a microprocessor, controller or any other suitable computing device or resource.

Conference resources 72a-72n available to MCUs may be utilized across any number of conferences taking place at the same time between any number of endpoints. For example, if an MCU has a certain number of communication ports 84a-84n available for conference use, one conference may utilize some of the communication ports 84a-84n while another conference taking place at the same time may utilize the rest of the communication ports 84a-84n. If conference participants leave a conference, the communication ports 84a-84n and other conference resources 72a-72n utilized by those conference participants may be made available to other conferences.

As indicated above, conference setup unit 90 and conference resource management unit 100 may cooperate, in particular embodiments, to reserve and manage conference resources 72a-72n. As used herein, conference resources 72a-72n may include any hardware or software component utilized by an MCU for hosting a conference between participants. Conference resources 72a-72n may include, for example, bandwidth, audio and video communication ports (such as or in addition to ports 84a-84n), and DSP resources for transcoding or mixing. Conference resources 72a-72n may also include lap top computers, telephone or other communication systems, projectors, white boards, video displays, and other appropriate hardware for assisting or facilitating a conference meeting. Although the term "conference participant" may generally lend itself to users of conference endpoints, such as users 71a-71n, "conference participants," for purposes of this document, may also include conference resources such as those described above. Because conference resources are described herein as being identified and reserved for use prior to a meeting and as being automatically configured without user intervention, such conference resources 72a-72n are considered conference participants for purposes of this document.

In a particular embodiment, the setup and management of conference resources is performed in whole or in part by conference setup unit 90 and conference management unit 100. In particular, conference setup unit 90 invites participants to a multipoint conference and automatically reserves conference resources 72a-72n based on the identified requirements of the conference scheduler or the invited participants. Conference management unit 100 then operates to manage the use of conference resources 72a-72n during the conference meeting. For example, conference management unit 100 may automatically initiate operation of conference resources at the occurrence of or just prior to the scheduled time for the conference. Accordingly, conference setup unit 90 and conference resource management unit 100 may include any suitable hardware, software and/or embedded logic to accomplish these functions as well as other functions described herein.

In particular embodiments, conference setup unit 90 may include an invite and a resource reservation module which may be integrated within a calendar system used by a conference moderator or administrator to invite participants and set up the multipoint conference. In other embodiments, conference resource management unit 100 may include or access a calendar system to manage conference resources 72a-72n during the conference meeting. Thus, a calendaring system (whether distributed at a conference setup unit 90, conference resource management unit 100, or at participant endpoints), may be integrated with conference system 60 to better utilize information available on a network.

In operation, a user setting up a multipoint conference to be hosted by MCU 80 may use conference setup unit 90 to identify one or more conference resources 72a-72n to be utilized in a conference meeting. Alternatively, invited participants may identify the one or more conference resources 72a-72n to be utilized in a conference meeting. Once identified, conference setup unit 90 and/or conference resource management unit 100 operate to reserve the identified conference resources for the scheduled meeting. For example, conference setup unit 90 may thus reserve the number of communication ports of MCU 80 hosting the conference that the scheduler and participants collectively indicate that they will need. Conference setup unit 90 may also reserve other conference resources such as appropriate DSP resources to host a multipoint conference between 15 participants. Other conference resources that may be reserved include lap top computers, telephone or other communication systems, projectors, white boards, video displays, and other appropriate conference equipment.

Once conference resources 72a-72n are reserved for the scheduled conference meeting, conference resource management unit 100 may continue the operation by maintaining or accessing a calendaring or reservation system. As described above, the calendaring system may be maintained by any one of the elements of conference system 60 or by endpoints 70a-70n. Upon the occurrence of a triggering event, conference resource management unit 100 may access database, such as database 86 or another database accessible to conference resource management unit 100, to determine the particular conference resources 72a-72n that are reserved for the conference meeting. Alternatively, conference resource management unit 100 may communicate with conference setup unit 90 to determine the particular conference resources 72a-72n that are reserved for the conference meeting. Conference resource management unit 100 may then initiate operation of the reserved conference resources by powering up or otherwise automatically configuring conference resources 72a-72n.

For example, a conference scheduler may schedule a conference meeting by specifying a number of conference participants and a time and place of the meeting. The conference scheduler may also specify multiple video and audio ports 84a-84n for the conference call. Alternatively or additionally, the conference scheduler may specify particular equipment, such as a projector and an electronic white board, to be used in the conference meeting. Conference setup unit 90 may then reserve the specified resources. Because the conference resources specified by the conference scheduler are "conference enabled," the conference resources 72a-72n may be automatically configured at the beginning of the meeting or just before the meeting. For example, conference resource management unit 100 may initiate the automatic dialing of conference room output/sources when the conference call is scheduled to start. As a result, in a particular example scenario discussed above, conference resource management unit 100 may power up the projector and the electronic white board just before the meeting is to start.

The automatic configuration of reserved conference resources allows the initiation of a conference meeting to be more seamless. Conference participants are less likely to be focused on getting equipment up and running and more focused on the substantive purpose of the conference. Furthermore, because conference system 60 provides the above-described services on a multipoint level to endpoints 70a-70n at different locations, conference equipment at different locations may be powered up at the same time. Conference participants at all the locations may be brought into the conference at the same time, preventing some conference participants from missing the beginning of a conference meeting.

In particular embodiments, conference resource management unit 100 may prompt conference participants such as users 71a-71n for authentication information before the conference resources are accessible to the users 71a-71n. For example, although a projector may automatically power up at the start of the conference meeting, a computer system communicating with the projector may request user authentication information before the projector begins to project conference content. In this manner, conference resource management unit 100 may provide security services preventing abuse of conference system equipment. Additionally, authentication may be useful in determining attendance and for confirming that conference resources will actually be needed for the conference meeting.

Figure 3:
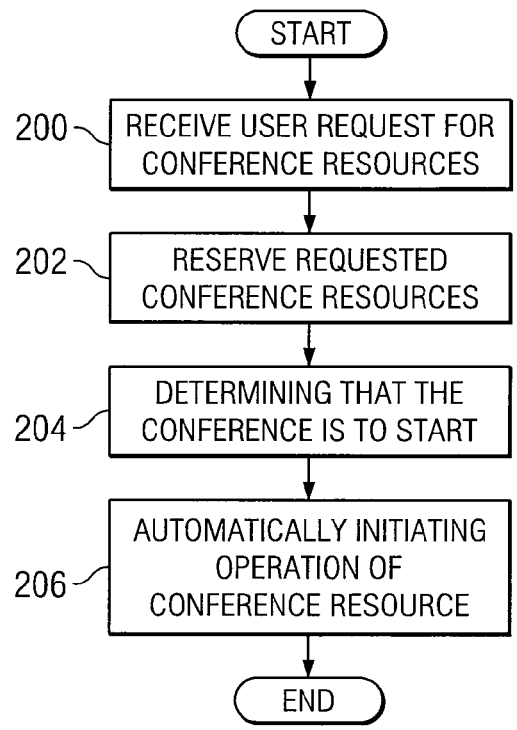
FIG. 3 is a flowchart illustrating a method for managing conference resources, in accordance with a particular embodiment.

FIG. 3 is a flowchart illustrating a method for automatically configuring conference resources, in accordance with a particular embodiment. The method begins at step 200 where a user request identifying at least one conference resource to be used in a conference is received. Such a request may, in particular embodiments, be received by the conference system from the conference scheduler directly or from an invited conference participant. For example, while initially setting up a conference, a conference scheduler may identify the particular resources to be used by some or all of the conference participants. Alternatively or additionally, the request may be received from conference participants as they are responding to an invite to attend a conference.

At step 202, the requested conference resources are reserved by the conference system. In particular embodiments, for example, the conference meeting and the requested conference resources may be placed on a calendar that is maintained by the conference system or an endpoint or other module in communication with the conference system.

It is then determined at step 204 that the conference is about to start. Where a calendar or other reservation system is used by the conference system, the calendar may be used to determine that the conference is scheduled to start within a predetermined amount of time. In response to the determination that the conference is about to start, the reserved conference resources may be automatically configured for use during the conference. For example, the operation of the reserved conference resources may be automatically initiated without user interaction. As such, a projector, video display, computer, and/or other conference resource equipment may be automatically powered up or otherwise configured for use during the conference. Such automatic configuration may be performed without any user interaction.

Some of the steps illustrated in FIG. 3 may be combined, modified or deleted where appropriate, and additional steps may also be added to the flowchart. Additionally, steps may be performed in any suitable order without departing from the scope of the invention.

Technical advantages of particular embodiments include systems and methods that enable conference resources to act as active participants in a conference meeting. For example, conference resources may be automatically configured to power on or otherwise begin to operate based on a calendared event or other reservation-triggered event. Specifically, reserved conference resources may be automatically powered-up at the occurrence of or just before a designated time of the conference. As a result, the initiation of a conference may be more seamless, and conference participants may focus on the substantive purpose of the conference meeting rather than the equipment being used. Employee resources are saved since conference attendees are not required to get conference equipment up and running prior to the conference meeting. Furthermore, where the above-described services are offered on a multipoint level, conference equipment at different locations may be powered up at the same time. Accordingly, certain embodiments, may allow conference participants at all the locations to be brought into the conference at the same time, preventing some conference participants from missing the beginning of a conference meeting.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a conference system, a conference set up unit, a conference resource management unit, an MCU and participant endpoints, these elements may be combined, rearranged or positioned in order to accommodate particular routing architectures or needs. In addition, any of these elements may be provided as separate external components to a conference system, a conference resource management unit, a conference setup unit, an MCU or a participant endpoint where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for the automatic configuration of conference resources, comprising:
   receiving a user request identifying at least one conference resource to be used in a conference, the at least one conference resource comprising a plurality of communication ports;
   reserving the at least one conference resource for the conference;
   reserving at least two of the plurality of communication ports for a time associated with when the conference is scheduled to start;
   without user interaction, automatically initiating operation of the at least one conference resource within a predetermined amount of time before the conference is scheduled to start; and
   without user interaction, automatically configuring the at least two of the plurality of communication ports within the predetermined amount of time before the conference is scheduled to start, and
   wherein the user request is received from a conference participant invited to participate in the conference.

2. The method of claim 1, wherein the at least one conference resource comprises at least one equipment resource for use at a physical location associated with the conference.

3. The method of claim 2, wherein the at least one equipment resource is selected from the group consisting of a projector, a video display, a telephone, a white board, a computer, an audio port, a video communication ports, and a television.

4. The method of claim 1, wherein the at least one conference resource comprises at least one telecommunications equipment resource.

5. The method of claim 1, wherein the at least one conference resource comprises at least one video equipment resource.

6. The method of claim 1, wherein automatically initiating operation of the at least one conference resource comprises powering up the at least one conference resource.

7. The method of claim 6, further comprising:
in response to powering up the at least one conference resource, requesting authentication information from the conference participant.

8. The method of claim 1, wherein automatically initiating operation of the at least one conference resource comprises:
automatically powering up the at least one conference resource; and
requesting authentication of a conference participant before the conference resource may be utilized.

9. The method of claim 1, wherein the user request comprises a response to an invitation to join the conference, the user request accepting the invitation and identifying the at least one conference resource to be used by the user during the conference.

10. A method for the automatic configuration of conference resources, comprising:
receiving a user request identifying at least one conference resource to be used in a conference, the at least one conference resource comprising a plurality of communication ports;
receiving a scheduling request from a conference scheduler setting up the conference;
reserving the at least one conference resource for the conference;
reserving at least two of the plurality of communication ports for a time associated with when the conference is scheduled to start;
without user interaction, automatically configuring the at least two of the plurality of communication ports within a predetermined amount of time before the conference is scheduled to start; and
without user interaction, automatically initiating operation of the at least one conference resource, and
wherein the user request is received from a conference participant invited to participate in the conference.

11. A method for the automatic configuration of conference resources, comprising:
receiving a user request identifying at least one conference resource to be used in a conference, the at least one conference resource comprising a plurality of communication ports;
reserving the at least one conference resource for the conference;
reserving at least two of the plurality of communication ports for a time associated with when the conference is scheduled to start;
without user interaction, automatically initiating operation of the at least one conference resource;
without user interaction, automatically configuring the at least two of the plurality of communication ports within a predetermined amount of time before the conference is scheduled to start, and
wherein the user request is received from a conference participant invited to participate in the conference,
wherein reserving the at least one conference resource for the conference comprises placing the at least one conference resource on a calendar, the method further comprising:
using the calendar to determine that the conference is scheduled to start within a predetermined amount of time; and
in response to determining that the conference is scheduled to start within the predetermined amount of time, automatically powering up the at least one conference resource.

12. A system for the automatic configuration of conference resources, comprising:
an interface operable to receive a user request identifying at least one conference resource to be used in a conference, the at least one conference resource comprising a plurality of communication ports; and
a processor coupled to the interface, the processor comprising:
a conference setup unit operable to reserve the at least one conference resource for the conference and to reserve at least two of the plurality of communication ports for a time associated with when the conference is scheduled to start; and
a conference resource management unit operable to:
without user interaction automatically initiate operation of the at least one conference resource within a predetermined amount of time before the conference is scheduled to start; and
without user interaction, automatically configure the at least two of the plurality of communication ports within the predetermined amount of time before the conference is scheduled to start, and
wherein the user request is received from a conference participant invited to participate in the conference.

13. The system of claim 12, wherein the interface is further operable to receive a scheduling request from a conference scheduler setting up the conference.

14. The system of claim 12, wherein the at least one conference resource comprises at least one equipment resource for use at a physical location associated with the conference.

15. The system of claim 14, wherein the at least one equipment resource is selected from the group consisting of a projector, a video display, a telephone, a white board, a computer, an audio port, a video communication ports, and a television.

16. The system of claim 12, wherein the at least one conference resource comprises at least one telecommunications equipment resource.

17. The system of claim 12, wherein the at least one conference resource comprises at least one video equipment resource.

18. The system of claim 12, wherein the conference resource management unit is operable to initiate operation of the at least one conference resource by powering up the at least one conference resource.

19. The system of claim 12, wherein:
the conference set up unit is operable to reserve the at least one conference resource for the conference by placing the at least one conference resource on a calendar; and
the conference resource management unit is further operable to:
use the calendar to determine that the conference is scheduled to start within a predetermined amount of time; and in response to determining that the conference is scheduled to start within the predetermined amount of time, automatically power up the at least one conference resource.

20. The system of claim 12, wherein when automatically initiating operation of the at least one conference resource, the conference resource management unit is further operable to:
 automatically powering up the at least one conference resource; and
 requesting authentication of a conference participant before the conference resource may be utilized.

21. A system for the automatic configuration of conference resources, comprising:
 means for receiving a user request identifying at least one conference resource to be used in a conference, the at least one conference resource comprising a plurality of communication ports;
 means for reserving the at least one conference resource for the conference;
 means for reserving at least two of the plurality of communication ports for a time associated with when the conference is scheduled to start;
 means for automatically initiating operation of the at least one conference resource within a predetermined amount of time before the conference is scheduled to start; and
 means for automatically configuring, without user interaction, the at least two of the plurality of communication ports within the predetermined amount of time before the conference is scheduled to start, and
 wherein the user request is received from a conference participant invited to participate in the conference.

22. The system of claim 21, wherein the at least one equipment resource is selected from the group consisting of a projector, a video display, a telephone, a white board, a computer, an audio port, a video communication ports, and a television.

23. The system of claim 21, wherein the means for automatically initiating operation of the at least one conference resource comprises means for powering up the at least one conference resource.

24. The system of claim 21, wherein the means for reserving the at least one conference resource for the conference comprises means for placing the at least one conference resource on a calendar, the system further comprising:
 means for using the calendar to determine that the conference is scheduled to start within a predetermined amount of time; and
 means for automatically powering up the at least one conference resource in response to determining that the conference is scheduled to start within the predetermined amount of time.

25. The system of claim 21, wherein the means for automatically initiating operation of the at least one resource, comprises:
 means for automatically powering up the at least one conference resource; and
 means for requesting authentication of a conference participant before the conference resource may be utilized.

26. A computer readable medium being a non-transitory signal encoded with instructions capable of being executed by a computer, the computer readable medium operable when executed by the computer to:
 receive a user request identifying at least one conference resource to be used in a conference, the at least one conference resource comprising a plurality of communication ports;
 reserve the at least one conference resource for the conference;
 reserve at least two of the plurality of communication ports for a time associated with when the conference is scheduled to start;
 without user interaction, automatically initiating operation of the at least one conference resource within a predetermined amount of time before the conference is scheduled to start; and
 without user interaction, automatically configure the at least two of the plurality of communication ports within the predetermined amount of time before the conference is scheduled to start, and
 wherein the user request is received from a conference participant invited to participate in the conference.

27. The computer readable medium of claim 26, wherein the instructions are operable, when executed by the computer, to receive a scheduling request from a conference scheduler setting up the conference.

28. The computer readable medium of claim 26, wherein the at least one conference resource comprises at least one equipment resource for use at a physical location associated with the conference.

29. The computer readable medium of claim 28, wherein the at least one equipment resource is selected from the group consisting of a projector, a video display, a telephone, a white board, a computer, an audio port, a video communication ports, and a television.

30. The computer readable medium of claim 26, wherein the instructions are operable, when executed by the computer, to automatically initiate operation of the at least one conference resource by powering up the at least one conference resource.

31. The computer readable medium of claim 26, wherein the instructions are operable, when executed by the computer, to reserve the at least one conference resource for the conference by placing the at least one conference resource on a calendar, the logic further operable to:
 use the calendar to determine that the conference is scheduled to start within a predetermined amount of time; and
 in response to determining that the conference is scheduled to start within the predetermined amount of time, automatically power up the at least one conference resource.

32. The computer readable medium of claim 26, wherein when automatically initiating operation of the at least one conference resource, the instructions are further operable, when executed by the computer, to:
 automatically power up the at least one conference resource; and
 request authentication of a conference participant before the conference resource may be utilized.

33. A method for the automatic configuration of conference resources, comprising:
 receiving a first user request from a conference scheduler, the first user request requesting the scheduling of a conference and identifying a plurality of conference participants, the first user request identifying at least one conference resource to be used at a location associated with the conference scheduler during the conference;
 receiving a second user request from a conference participant, the second user request accepting an invitation to participate in the conference, the second user request identifying at least one conference resource to be used at a location associated with the conference participant during the conference, the at least one conference resource to be used at the location associated with the conference participant comprising a plurality of communication ports;

reserving the at least one conference resource at the location associated with the conference scheduler;

reserving the at least one conference resource at the location associated with the conference participant;

reserving at least two of the plurality of communication ports at the location associated with the conference participant for a time associated with when the conference is scheduled to start;

without user interaction, automatically initiating operation of the at least one conference resource at the location associated with the conference scheduler and the at least one conference resource at the location associated with the conference participant within a predetermined amount of time before the conference is scheduled to start; and without user interaction, automatically configuring the at least two communication ports within the predetermined amount of time before the conference is scheduled to start.

* * * * *